(12) United States Patent
Miyake

(10) Patent No.: US 7,310,295 B2
(45) Date of Patent: Dec. 18, 2007

(54) OPTICAL DISK DRIVE DEVICE AND METHOD FOR CORRECTING TILT OF OPTICAL PICKUP

(75) Inventor: Tomoyuki Miyake, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 10/533,600

(22) PCT Filed: Nov. 5, 2003

(86) PCT No.: PCT/JP03/14098

§ 371 (c)(1),
(2), (4) Date: May 2, 2005

(87) PCT Pub. No.: WO2004/044906

PCT Pub. Date: May 27, 2004

(65) Prior Publication Data

US 2006/0059500 A1 Mar. 16, 2006

(30) Foreign Application Priority Data

Nov. 5, 2002 (JP) .............................. 2002-321300

(51) Int. Cl.
*G11B 7/00* (2006.01)
(52) U.S. Cl. .................. 369/53.19; 369/44.32
(58) Field of Classification Search ...................... None
See application file for complete search history.

(56) References Cited

U.S. PATENT DOCUMENTS 4,918,679 A * 4/1990 Opheij et al. ............ 369/44.23
5,703,856 A * 12/1997 Hayashi et al. ............ 369/53.2

FOREIGN PATENT DOCUMENTS

| DE | 37 06 966 A1 | 9/1987 |
|---|---|---|
| DE | 197 51 378 A1 | 5/1999 |
| EP | 0 516 390 A2 | 12/1992 |
| JP | 06-131681 | 5/1994 |
| JP | 07-311945 | 11/1995 |
| JP | 07-320290 | 12/1995 |
| JP | 08-115577 | 5/1996 |
| JP | 09-282671 | 10/1997 |
| JP | 11-016186 | 1/1999 |
| JP | 2000-076679 | 3/2000 |
| JP | 2000-113500 | 4/2000 |
| JP | 2002-074864 | 3/2002 |

* cited by examiner

OTHER PUBLICATIONS

Machine translation of JP 06-131681.*

*Primary Examiner*—William R. Korzuch
*Assistant Examiner*—Peter Vincent Agustin
(74) *Attorney, Agent, or Firm*—George W. Neuner; David G. Conlin; Edwards Angell Palmer & Dodge LLP

(57) ABSTRACT

A tilt sensor 23 is provided on a CD optical pickup 11, and a sub-chassis 24 and a height adjustment mechanism 25 and the like are provided for adjusting the tilt of a DVD optical pickup 12. A recording or reproduction position is read in by the DVD optical pickup 12 while moving the CD optical pickup 11 and the DVD optical pickup 12 along guide shafts 18 and 26 respectively, the amount of tilt of the optical disk 16 at this position is detected by the tilt sensor 23 of the CD optical pickup 11, the tilt of the laser light axis from the DVD optical pickup 12 is adjusted in accordance with the amount of tilt that is detected, and the amount of tilt of the optical disk 16 is corrected.

8 Claims, 3 Drawing Sheets

OPTICAL DISK DRIVE DEVICE AND METHOD FOR CORRECTING TILT OF OPTICAL PICKUP

TECHNICAL FIELD

The present invention relates to optical disk drive devices for recording or reproducing optical disks, and to methods for correcting tilt of optical pickups.

BACKGROUND ART

As is well known, because the basic material of optical disks is synthetic resin, they may deform in a curve when formed. When a deformed disk is loaded onto a turntable of an optical disk drive, the recording surface of the optical disk is tilted with respect to an optical pickup, and laser light that is emitted from the optical pickup may not be radiated perpendicularly onto the recording surface of the optical disk. In this state, the spot of the laser light on the recording surface of the optical disk deforms generating coma aberration, and causing recording and reproduction errors of the optical disk.

Thus, for example JP H9-7207A discloses a technique for detecting the tilt angle (amount of tilt) of a recording surface of an optical disk while adjusting the tilt of a laser light axis from an optical pickup in accordance with the amount of tilt that is detected, and causing the laser light that is emitted from the optical pickup to be perpendicularly incident on the recording surface of the optical disk to correct the amount of tilt.

FIG. 3 shows an example of a conventional optical disk drive device. In this device, an optical disk 101 is clamped between a damper 102 and a turntable 103, and the turntable 103 is rotated by a spindle motor 104. Furthermore, the spindle motor 104 is fixably supported by a main chassis 105. One end of a sub-chassis 106 is linked to the main chassis 105 by a shaft 106a to support the sub-chassis 106 such that it is capable of tilting, and the other end of the sub-chassis 106 is freely supported by a support member 110 such that the sub-chassis 106 can move vertically with respect to the main chassis 105, and the other end of the sub-chassis 106 is elevated by a height adjusting mechanism 107 to control the tilt of the sub-chassis 106. A guide shaft 108 is fixed above the sub-chassis 106, an optical pickup 109 is supported by the guide shaft 108 such that it can freely move in the radial direction of the optical disk 101, and the optical pickup 109 is moved by a carrying mechanism 111. A tilt sensor 112 for detecting the tilt of the optical disk 101 is provided on the optical pickup 109.

Thus, while moving the optical pickup 109 in the radial direction of the optical disk 101, the amount of tilt of the optical disk 101 is detected by the tilt sensor 112 at the same time as recording or reproducing the optical disk 101 with the optical pickup 109, the tilt of the sub-chassis 106 is adjusted in accordance with the amount of tilt of the optical disk 101 by the height adjustment mechanism 107 to adjust the tilt of the optical pickup 109, and the laser light that is emitted from the optical pickup 109 is perpendicularly irradiated onto the recording surface of the optical disk 101. Thus, the amount of tilt is corrected.

Furthermore, JP 2000-76679A discloses a technique in which an optical pickup that contains two optical system for handling two different types of optical disks is used, wherein when one optical system is used for recording or reproducing an optical disk, the amount of tilt of the optical disk is detected by the other optical system.

However, in the techniques of both JP H9-7207A and JP 2000-76679A, the position for detecting the amount of tilt of the optical disk is fixed with respect to the position for recording or reproducing the optical disk, and it has not been possible to adjust (move) the position for detecting the amount of tilt with respect to the position for recording or reproduction during recording or reproduction. For example, in the technique of JP 9-7207A, it has not been possible to let the position for detecting the amount of tilt coincide with the position for recording or reproduction.

Furthermore, in the technique of JP 2000-76679A, if the laser wavelengths differ, then when one optical system is focused for recording or reproducing an optical disk, the focus of the other optical system is lost. Thus, the detection of the tilt of the optical disk with the other optical system may be adversely affected by fluctuations in, for example, the thickness of the substrate or refractive index of the optical disk.

Thus, in view of the above-noted conventional problems, and on the precondition that at least two optical pickups are provided for recording or reproducing optical disks such as CD (Compact Disc) and DVD (Digital Versatile Disk), it is an object of the present invention to provide an optical disk drive device that is capable of adjusting the position for detecting the amount of tilt in the radial direction of the optical disk with respect to the position for recording or reproduction while detecting the amount of tilt at the same time as recording or reproducing the optical disk, and to provide a method for correcting the tilt of the optical pickup.

DISCLOSURE OF INVENTION

In order to solve the aforementioned issues, the optical disk drive device of the present invention is provided with at least two optical pickups, a guiding means for each optical pickup for moving the optical pickups in the radial direction of an optical disk, a tilt detecting means provided on at least one of the optical pickups for detecting the tilt of the optical disk and a tilt correcting means, provided on at least the other of the optical pickups for adjusting the tilt of a laser light axis from the optical pickup with respect to the optical disk, in accordance with a detection result of the tilt detecting means, wherein the present invention detects the tilt of the optical disk by the tilt detecting means on the one of the optical pickups, and records or reproduces the optical disk, and adjusts the tilt of the laser light axis from the optical pickup by the tilt correcting means on the other of the optical pickups.

With the present invention having such a configuration, with the precondition that at least two optical pickups are provided to record or reproduce optical disks such as CD or DVD, the tilt of the optical disk is detected by tilt detecting means with one of the optical pickups, and recording or reproduction of the optical disk, and correction of the tilt of the laser light axis from the optical pickup is performed by the other optical pickup. Thus, for example, it is possible to position the optical pickups, for example, in the same position in the radial direction of the optical disk, detect the tilt of the optical disk at this position, record or reproduce the optical disk and adjust the tilt of the laser light axis from the optical pickup. Furthermore, since focusing of the optical pickups is carried out separately, it is possible to favorably perform both detection of the tilt of the optical disk, and recording or reproduction of the optical disk.

In the present invention, the position of the guide means of the other optical pickup is adjusted and fixed with respect to a disk receiving surface of a turntable, such that the tilt of the laser light axis from the other optical pickup on which the tilt detecting means is provided is 0 (zero) with respect to the disk receiving surface of the turntable onto which the optical disk is loaded. This configuration is effective when assembling the present optical disk drive device.

In this way, the accuracy of detecting the tilt of the optical disk by the tilt detecting means is increased.

Moreover, in the present invention, the optical pickups are moved in the radial direction of the optical disk by the respective guiding means, the one optical pickup that is provided with the tilt detecting means is moved ahead of the other optical pickup that is provided with the tilt correcting means, and in the same position in the radial direction of the optical disk, detection of the tilt of the optical disk by the tilt detecting means of the one optical pickup is performed ahead of adjustment of the tilt of the laser light axis from the other optical pickup by the tilt correcting means.

In this way, if the detection position of the tilt of the optical disk is moved to a position that is always an appropriate distance ahead of the recording or reproduction position of the optical disk, then it is possible to cancel out the time lag from detecting the tilt of the optical disk at the recording or reproduction position to adjusting the tilt.

The present invention is configured such that the one optical pickup that is provided with the tilt detecting means is moved in the radial direction of the optical disk by the guiding means to detect the tilt of the optical disk by the tilt detecting means while initial settings relating to recording or reproduction of the optical disk are performed on the other optical pickup side that is provided with the tilt correcting means.

In this way, if the one optical pickup is moved in the radial direction of the optical disk to detect the tilt of the optical disk by the tilt detecting means while the initial settings relating to recording or reproducing the optical disk are performed on the other optical pickup side, then it is possible to detect the characteristics of the tilt of the optical disk with respect to the position in the radial direction of the optical disk before commencing recording or reproduction of the optical disk.

Moreover, the present invention is provided with a memory for storing at least tilt information about the tilt of the optical disk that is detected by the tilt detecting means. In this case, it is possible to store the relationship of the tilt to the radial position of the optical disk in this memory. Also in this case, at least during recording or reproduction of the optical disk, the tilt information and the radial position information may be stored and held in this memory. It should be noted that the radial position information of the optical disk noted here is radial position information about the radial position in the radial direction of the optical disk in which at least the one optical pickup is moved in the radial direction of the optical disk by the guiding means.

If such a memory is used, then it is possible to read out the tilt of the optical disk in the memory, from the information that was stored in the memory when recording or reproducing the optical disk, in order to correct the tilt of the laser light axis from the optical pickup with the tilt correcting means.

In order to solve the above-noted issues, the method for correcting tilt of the optical pickup of the present invention includes a step of performing recording or reproduction of an optical disk by a first optical pickup while moving the first optical pickup in the radial direction of the optical disk, and of detecting the position of the first optical pickup in the radial direction of the optical disk, a step of moving a second optical pickup to the position, or the vicinity of the position, of the first optical pickup that was detected, and of detecting the tilt of the optical disk on the side of the second optical pickup, and a step of adjusting the tilt of a laser light axis from the first optical pickup, in accordance with the tilt of the optical disk that was detected.

Even with a method for correcting tilt, such as in the present invention, it is possible to achieve a similar operation and effect as that of the optical disk drive device of the present invention.

BEST MODE FOR CARRYING OUT THE INVENTION

The embodiments of the present invention are described in detail below, based on the drawings.

First Embodiment

Figure 1:
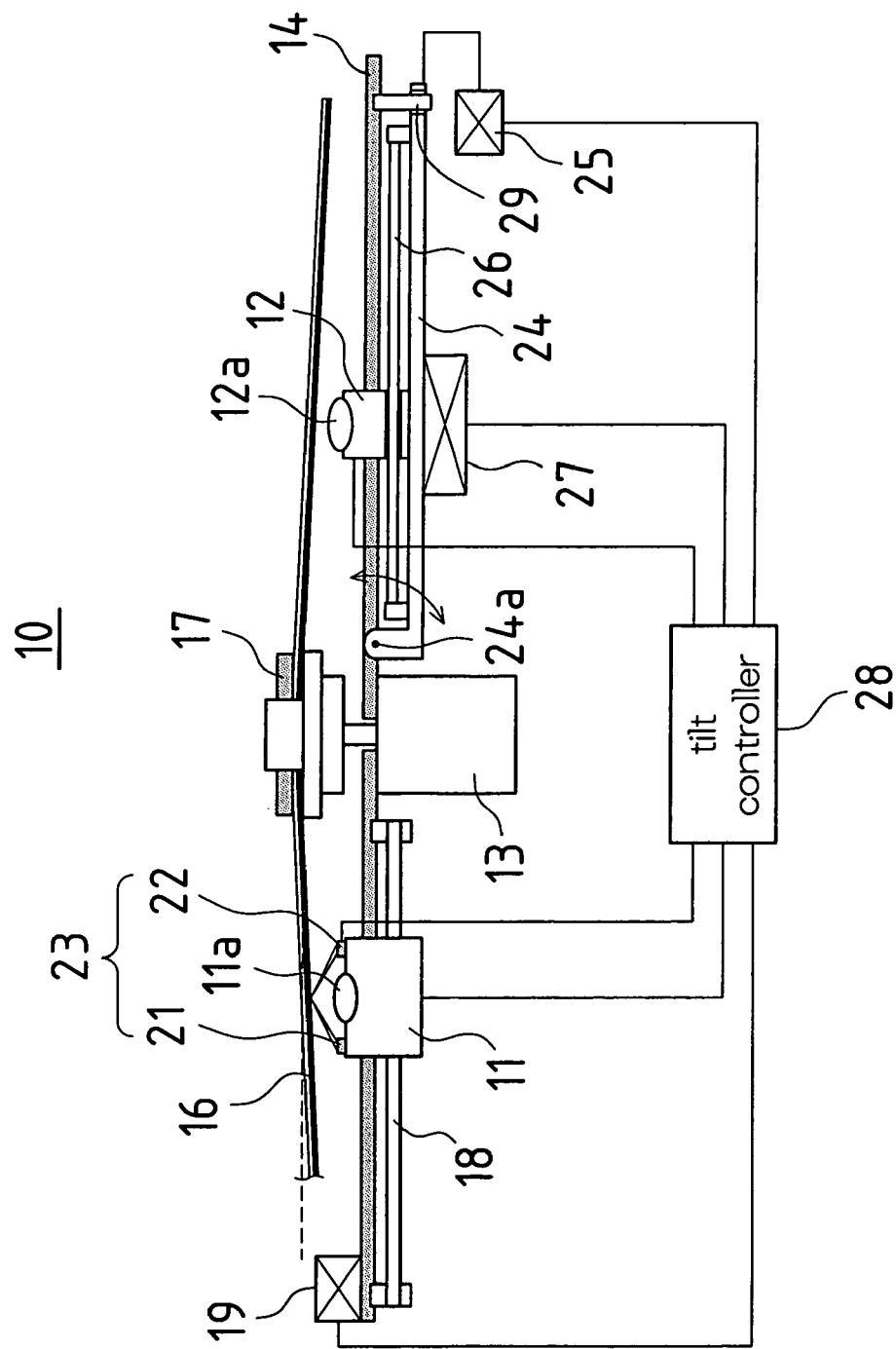
FIG. 1 is a lateral view showing a first embodiment of the optical disk drive device of the present invention.

FIG. 1 shows a first embodiment of the optical disk drive device of the present invention. An optical disk drive device 10 of the present embodiment is capable of handling CD and DVD optical disks, and is provided with a CD optical pickup 11 and a DVD optical pickup 12.

In the optical disk drive device 10, a spindle motor 13 is fixed to a main chassis 14, and a turntable 15 is fixed to the upper end of the spindle motor 13. An optical disk 16 is loaded onto the turntable 15 and clamped between the turntable 15 and a damper 17, and the optical disk 16 is rotated by the spindle motor 13.

Furthermore, both ends of a guide shaft 18 are fixed onto the lower surface of the main chassis 14, the CD optical pickup 11 is supported by the guide shaft 18 such that the CD optical pickup 11 is movable in the radial direction of the optical disk 16 and the CD optical pickup 11 is moved along the guide shaft 18 by a carrying mechanism 19.

The CD optical pickup 11 receives laser light that passes through the objective lens 11a and is irradiated onto the optical disk 16, and that is reflected by the optical disk 16 and passes through the objective lens 11a.

A tilt sensor 23 made from a light emitting element 21 and a light receiving element 22 is arranged on the upper side of the CD optical pickup 11. The tilt sensor 23 detects the angle of tilt (amount of tilt) of the recording surface of the optical disk 16. The initial position of the CD optical pickup 11 is set by the positioning of the guide shaft 18 with respect to the main chassis 14. The positioning of the guide shaft 18 is performed during initial adjustment of the optical disk drive device 10, wherein the disk receiving surface of the turntable 15 is assumed to be the recording surface of the optical disk, and the positioning is performed such that laser light from the CD optical pickup 11 is perpendicularly incident on the disk receiving surface of the turntable 15. This adjustment is carried out by adjusting the guide shaft 18 to the tilt at which the output of a test signal is optimal (for example the maximum amplitude of the test signal), using a standard disk made from a glass substrate, for example, on which a test signal is recorded at zero tilt. When the adjustment is complete, the tilt sensor 23 is adjusted such that detected output of the tilt sensor 23 shows zero tilt.

On the other hand, one end of a sub-chassis 24 is linked to the main chassis 14 by a shaft 24a to inclinably support the sub-chassis 24, and the other end of the sub-chassis 24 is supported by a support member 29 so that the sub-chassis can move vertically with respect to the main chassis 14. The other end of the sub-chassis 24 is moved vertically by a height adjustment mechanism 25 to adjust the tilt of the sub-chassis 24 with respect to the main chassis 14. Furthermore, both ends of a guide shaft 26 are fixed to the upper surface of the sub-chassis 24, the DVD optical pickup 12 is supported by the guide shaft 26 so that it can move in the radial direction of the optical disk 16 and the DVD optical pickup 12 is moved along the guide shaft 26 by a carrying mechanism 27. When the tilt of the sub-chassis 24 is adjusted by the height adjustment mechanism 25, the tilt of the guide shaft 26 and the DVD optical pickup 12, that is to say the tilt of an objective lens 12a with respect to the optical disk 16 is corrected and the amount of tilt is corrected.

The DVD optical pickup 12 receives laser light that passes through the objective lens 12a and is irradiated onto the optical disk 16, and that is reflected by the optical disk 16 and passes through the objective lens 12a.

It should be noted that in order to make it possible to adjust the tilt of the DVD optical pickup 12 with the height adjustment mechanism 25, it is necessary to measure the height of the other end of the sub-chassis 24 that is elevated by the height adjustment mechanism 25 and the tilt of the DVD optical pickup 12, and to ensure that the relationship between these is known in advance.

A tilt controller 28 controls the CD optical pickup 11, the DVD optical pickup 12, the spindle motor 13, the carrying mechanisms 19 and 27 and the height adjustment mechanism 25, for example, and receives the detection output of the tilt sensor 23.

So, in an optical disk drive device 10 having such a configuration, if the optical disk 16 is a DVD, then recording or reproduction of the optical disk 16 is performed by the DVD optical pickup 12. The DVD optical pickup 12 is moved along the guide shaft 26 by the carrying mechanism 27 while emitting the laser light onto the optical disk 15, and receives the laser light that is reflected by the optical disk 16 to record or reproduce the optical disk 16. At the same time, the DVD optical pickup 12 reads in positional information that indicates the position in the radial direction of the optical disk 16 (for example, address information of the tracks) from the optical disk 16, and sends that positional information to the tilt controller 28. The tilt controller 28 controls the carrying mechanism 19, moves the CD optical pickup 11 along the guide shaft 18 and moves the detection position of the tilt sensor 23 to the position in the radial direction of the optical disk 16 that is indicated by the positional information. Thus, the detection position of the tilt sensor 23 always coincides with the recording and or reproduction position of the optical disk 16.

The tilt sensor 23 detects the amount of tilt of the optical disk 16 at the recording or reproduction position of the optical disk 16. The controller 28 controls the drive of the height adjustment mechanism 25, alters the tilt of the sub-chassis 24 in accordance with the amount of tilt that is shown by the detection output of the tilt sensor 23, and adjusts the tilt of the guide shaft 26 and the DVD optical pickup 12. Thus, the laser light from the DVD optical pickup 12 is perpendicularly incident on the recording surface of the optical disk 16, and the amount of tilt of the optical disk 16 is corrected.

In such an optical disk drive 10 of the present embodiment, the tilt sensor 23 is provided on the CD optical pickup 11; the sub-chassis 24 and the height adjustment mechanism 25, for example, are provided for adjusting the tilt of the DVD optical pickup 12; the CD optical pickup 11 and the DVD optical pickup 12 are moved along the guide shafts 18 and 26 respectively while the recording or reproduction position of the optical disk 16 is read in by the DVD optical pickup 12; the amount of tilt of the optical disk 16 at this position is detected by the tilt sensor 23 of the CD optical pickup 11; and the tilt of the DVD optical pickup 12 is adjusted in accordance with the amount of tilt that is detected to correct the amount of tilt of the optical disk 16. Thus, the laser light from the DVD optical pickup 12 is perpendicularly incident on the recording surface of the optical disk 16 in any position in the radial direction of the optical disk 16, and it is possible to suppress coma aberration and prevent recording or reproduction errors in optical disks.

Because the recording density of DVD optical disks is high, it is necessary to adjust this tilt to correct the amount of tilt of the optical disk 16 and suppress coma aberration even if the tilt of the DVD optical pickup 12 is only slight. For this reason, the sub-chassis 24 and the height adjustment mechanism 25, for example, are provided for adjusting the tilt of the DVD optical pickup 12.

On the other hand, for CD optical disks the recording density is lower than for DVD optical disks, and since the configuration of the optical system for the CD optical pickup 11 is simpler there is no particular necessity to adjust the tilt of the CD optical pickup 11. Thus, a mechanism specifically for adjusting the tilt of the CD optical pickup is not provided, and the tilt of the CD optical pickup 11 is only set during the initial adjustment of the optical disk drive device 10. Consequently, it is not necessary to detect the amount of tilt with the tilt sensor 23 when recording or reproducing CD optical disks.

It should be noted that by reading in the recording or reproduction position of the optical disk 16 by the DVD optical pickup 12 and detecting the amount of tilt of the optical disk 16 at an appropriate position ahead of this position by the tilt sensor 23 of the CD optical pickup 11, the tilt of the DVD optical pickup 12 may be adjusted in accordance with the amount of tilt that is detected. If the detection position of the tilt sensor 23 is arranged ahead of the recording or reproduction position in this way, it is possible to cancel the timelag between detecting the amount of tilt and adjusting the tilt of the DVD pickup 12.

Furthermore, when recording or reproducing DVD optical disks, instead of moving the CD optical pickup 11 and then detecting the amount of tilt with the tilt sensor 23, it is also possible to move the CD optical pickup 11 to detect the amount of tilt with the tilt sensor 23 during the initial setting of the laser power of the DVD optical pickup 12, for example, that is performed before commencing recording or reproduction. In this case, the characteristics of the amount of tilt with respect to a position in the radial direction of the optical disk are determined and these characteristics are stored in a memory (not shown). When recording or reproducing the optical disk, the address, for example, of the recording or reproduction position in the radial direction of the optical disk is calculated to read out the amount of tilt that corresponds to this recording or reproduction position, and the tilt of the DVD optical pickup 12 is adjusted in accordance with this amount of tilt to correct the amount of tilt.

Also conventionally, the characteristics of the amount of tilt with respect to the position in the radial direction of the optical disk have been determined by moving the optical pickup before commencing recording or reproducing the optical disk, however since recording or reproduction, and detection of the amount of tilt were performed by the same optical pickup, it has been necessary to set a separate time for determining these characteristics. Furthermore, in cases in which the optical disks have a high recording density and use a phase changing medium, a long time has been necessary (for example, 30 s) for the initial setting of the laser power of the optical pickup, for example, that is performed before commencing recording or reproduction. Thus, if detecting the amount of tilt before commencing recording or reproduction, the time taken before commencing recording or reproducing optical disks has been inordinately long.

When initially setting the laser power, for example, of a DVD optical pickup 12 such as in the present embodiment, if the CD optical pickup 11 is moved, the amount of tilt is detected by the tilt sensor 23 and the characteristics of the amount of tilt with respect to the position in the radial direction of the optical disk are detected, then there is no extension of the time before commencing recording or reproduction of the optical disk.

Furthermore, the present embodiment is not limited to the combination of CD and DVD optical disks, but may also include alternate combinations. For example, a combination of DVD and an optical disk that uses blue laser light (BD (Blu-ray disc)) may be considered. This BD is a new generation optical disk in which the recording density is even higher than DVD, and it is necessary to adjust the tilt of the laser light axis from the BD optical pickup during recording or reproduction. Thus, in the case of the combination of a DVD and a BD, the tilt of both the DVD optical pickup 12 and BD optical pickup is adjusted. That is to say, the tilt of the DVD optical pickup 12 and the BD optical pickup is adjusted by two types of tilt correction methods.

In order to adjust the tilt of the laser light axis from the BD optical pickup, it is also possible to use the sub-chassis 24 and the height adjustment mechanism 25, for example, in the same way as the DVD optical pickup 12. Furthermore, it is also possible to correct the amount of tilt by applying a mechanism for changing the tilt of the objective lens of the BD optical pickup through which the laser light passes (for example, an actuator for driving only the objective lens) and causing the laser light to be perpendicularly incident on the recording surface of the optical disk by changing the tilt of the objective lens. Even for the DVD optical pickup 12, it is possible to apply a mechanism for changing the tilt of the objective lens instead of the sub-chassis 24 and the height adjustment mechanism 25, for example. Correction of the tilt of the objective lens may be performed with an actuator, and this is a technique that is standard practice in DVD reproduction apparatuses. Moreover, the amount of tilt can also be corrected by alternative well known methods.

Furthermore, the tilt sensor 23 is provided on either one of the DVD optical pickup 12 or the BD optical pickup. For example, the tilt sensor 23 is provided on the DVD optical pickup 12. In this case, when recording or reproducing a BD, the DVD optical pickup 12 and the BD optical pickup are moved while reading in the recording or reproduction position of the optical disk with the BD optical pickup, the amount of tilt of the optical disk 16 at this radial position is detected by the tilt sensor 23 of the DVD optical pickup 12, and the direction of the laser light axis from the BD optical pickup is adjusted in accordance with the amount of tilt that is detected to correct the tilt. Furthermore, when recording or reproducing a DVD optical disk, the DVD optical pickup 12 is moved while detecting the amount of tilt of the optical disk 16 from the tilt sensor 23 of the DVD optical pickup 12, and the direction of the laser light axis from the DVD optical pickup 12 is adjusted in accordance with the amount of tilt that is detected to correct the tilt.

It is also possible to provide the tilt sensor 23 on both optical pickups, however it is necessary to take care with optical disks that are contained in cartridges. It is necessary to configure the tilt sensor 23 such that it is capable of measurement with an aperture portion provided on a cartridge (that is usually covered by a shutter). This is because, for example, even if the cartridge has an aperture, if the space between the optical disk and the tilt sensor 23 of the other optical pickup is blocked by the cartridge or the like, then detection of the amount of tilt may be impossible.

Furthermore, for both DVD and BD, a long time is necessary to initially set the laser power, for example, of the optical pickup that is performed before commencing recording or reproduction. Thus, during the initial setting of the laser power, for example, of an optical pickup that has no tilt sensor 23, as noted above, it is desirable to move the other optical pickup to detect the amount of tilt with the tilt sensor, and to record in a memory the characteristics of the amount of tilt with respect to the position of the radial direction of the optical disk.

Lastly, the combination of optical disks should not be limited to CD and DVD or DVD and BD as mentioned above, but can be set optionally. For example, the present invention may be arranged for HD DVD (High Definition DVD) instead of DVD.

Second Embodiment

Figure 2:
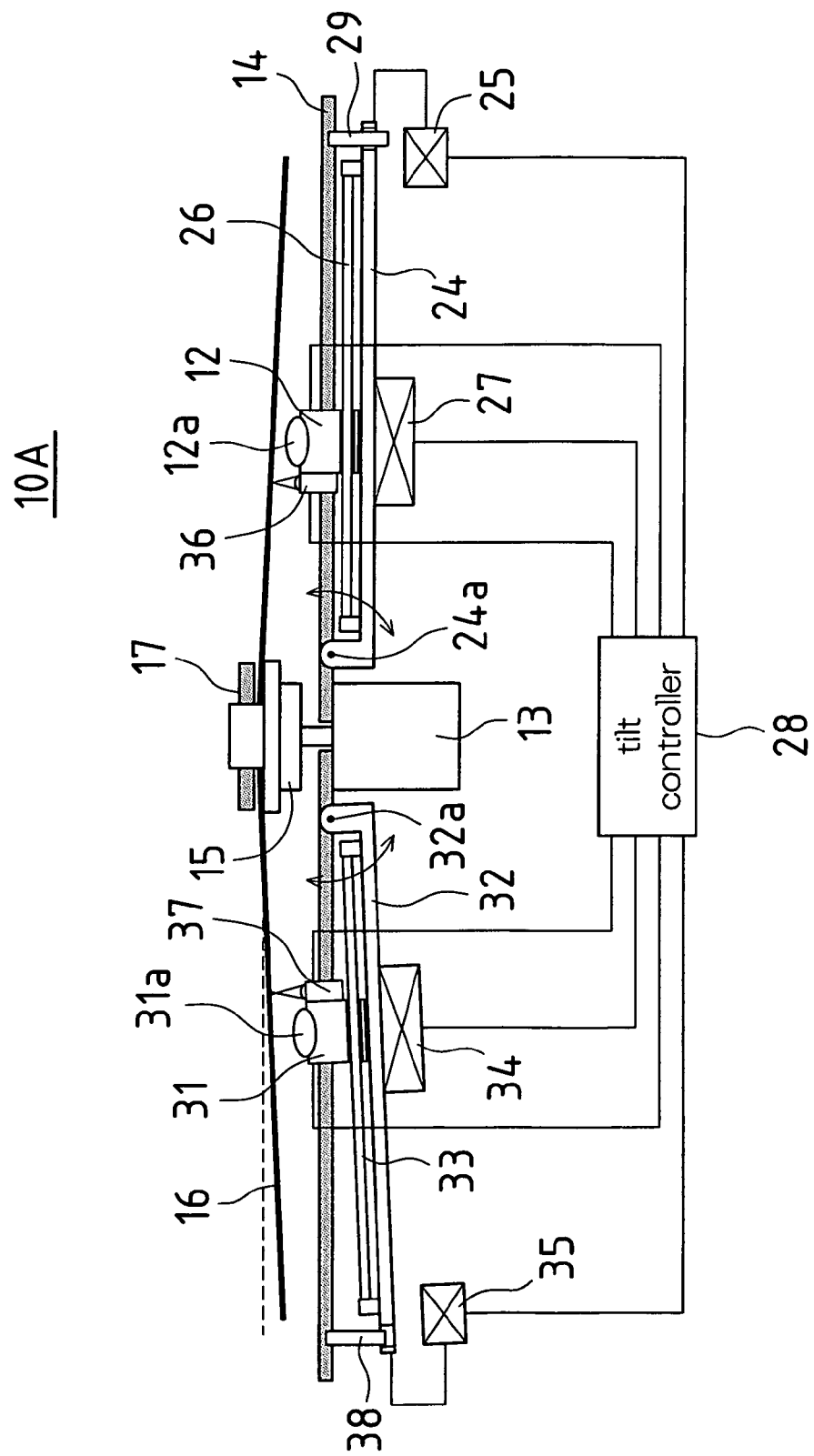
FIG. 2 is a lateral view showing a second embodiment of the optical disk drive device of the present invention.
Figure 3:
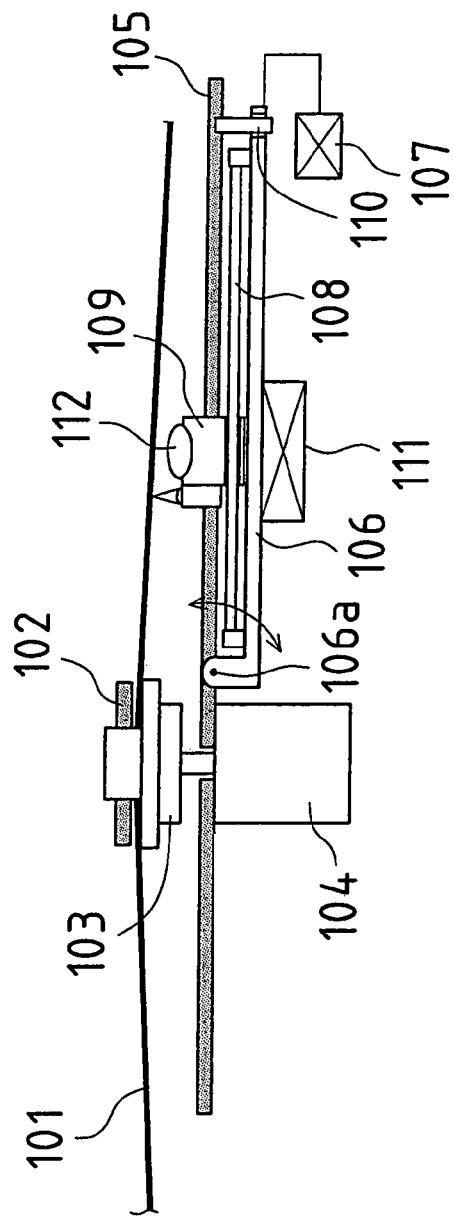
FIG. 3 is a lateral view showing a conventional optical disk drive device.

FIG. 2 shows a second embodiment of the optical disk drive device of the present invention. It should be noted that in FIG. 2, parts that perform the same operation as in FIG. 1 are provided with the same symbols.

An optical disk drive device 10A of the present embodiment is a device that can handle DVD and BD, and is provided with the DVD optical pickup 12 and a BD optical pickup 31.

In a similar manner to the DVD optical pickup 12, the BD optical pickup 31 is supported such that it is movable in the radial direction of the optical disk by a guide shaft 33 that is provided on the upper surface of a sub-chassis 32, and is movable along the guide shaft 33 by a carrying mechanism 34. One end of the sub-chassis 32 is linked to the main chassis 14 by a shaft 32a, the other end is supported by a supporting member 38 such that the sub-chassis 32 is capable of vertical movement with respect to the main chassis 14, and this other end is elevated by a height adjustment mechanism 35 to adjust the tilt. Thus the tilt of the guide shaft 33 and the BD optical pickup 31 is adjusted, and the amount of tilt of the optical disk 16 is corrected.

Tilt sensors 36 and 27 are respectively mounted on the DVD optical pickup 12 and the BD optical pickup 31. The tilt sensors 36 and 37 are well known technology (for example KU168 (trade name) from Stanley Electric Co. Ltd). After mounting the tilt sensors 36 and 37, a standard disk that has no curvature or warp is loaded onto the turntable 15, the adjustment heights of the height adjustment mechanisms 25 and 35 at which the recording or reproduction characteristics are optimal are determined while changing the tilt of the tilt sensors 36 and 37. The amount of tilt shown by the respective outputs of the tilt sensors 36 and 37 at this time is taken to be the standard amount of tilt (zero tilt), these standard amounts of tilt are associated with the adjustment heights of the height adjustment mechanisms 25 and 35, and are stored in a memory (not illustrated). Furthermore, the tilt sensitivity (output per unit of tilt amount) is determined based on sensitivity measurement data of the tilt sensors 36 and 37 obtained before they were mounted, and this tilt sensitivity is also stored in the memory.

In the optical disk drive device 10A, if the optical disk 16 is a DVD, then recording or reproduction of the optical disk 16 is performed while moving the DVD optical pickup 12, reading in the positional information from the optical disk 16 that shows the position in the radial direction of the optical disk 16, and sending this positional information to the tilt controller 28. The tilt controller 28 controls the carrying mechanism 34 to move the BD optical pickup 31 and moves the detection position of the tilt sensor 37 to the position in the radial direction of the optical disk 16 that is indicated by the positional information. Thus, the detection position of the tilt sensor 37 always coincides with the recording or reproduction position of the DVD optical pickup 12.

The tilt sensor 37 detects the amount of tilt of the optical disk 16 at the recording or reproduction position of the DVD optical pickup 12. The tilt controller 28 determines a target adjustment height such that the amount of tilt that is detected is the standard amount of tilt, in accordance with the amount of tilt that is detected by the tilt sensor 37, the standard amount of tilt that is in the aforementioned memory, the adjustment height of the height adjustment mechanism 25 corresponding to the standard amount of tilt, and the tilt sensitivity of the tilt sensor 37. The adjustment height of the height adjustment mechanism 25 is set to the standard adjustment height by drive controlling the height adjustment mechanism 25. In this way, the laser light from the DVD optical pickup 12 is set so as to be perpendicularly incident on the recording surface of the optical disk 16 since the tilt of the DVD optical pickup 12 is altered and the amount of tilt of the optical disk 16 is corrected.

If the optical disk 16 is a BD, then recording or reproduction of the optical disk 16 is performed while moving the BD optical pickup 31, the positional information indicating the position in the radial direction of the optical disk 16 is read in from the optical disk 16, and this positional information is sent to the tilt controller 28. The tilt controller 28 controls the carrying mechanism 27 to move the DVD optical pickup 12, and moves the detection position of the tilt sensor 36 to the position in the radial direction of the optical disk 16 indicated by the positional information. In this way, the positional information of the tilt sensor 36 always coincides with the recording or reproduction position of the BD optical pickup 31.

The tilt sensor 36 detects the amount of tilt of the optical disk 16 at the recording or reproduction position of the BD optical pickup 31. The tilt controller 28 determines a target adjustment height such that the amount of tilt that is detected is the standard amount of tilt, in accordance with the amount of tilt that is detected by the tilt sensor 36, the standard amount of tilt that is in the aforementioned memory (zero tilt), the adjustment height of the height adjustment mechanism 35 corresponding to the standard amount of tilt, and the tilt sensitivity of the tilt sensor 36. The adjustment height of the height adjustment mechanism 35 is set to the standard adjustment height by drive controlling the height adjustment mechanism 35. In this way, the laser light from the BD optical pickup 31 is set so as to be perpendicularly incident on the recording surface of the optical disk 16 since the tilt of the BD optical pickup 31 is altered and the amount of tilt of the optical disk 16 is corrected.

Moreover, if the DVD optical disk is contained in a cartridge, then the space between the optical disk and the tilt sensor 37 mounted on the BD optical pickup 31 is blocked by the cartridge, for example, and detection of the amount of tilt by the tilt sensor 37 is impossible. In this case, the amount of tilt of the optical disk 16 is detected by the tilt sensor 36 mounted on the DVD optical pickup 12 while the optical disk 16 is recorded or reproduced by the DVD optical pickup 12, and the height adjustment mechanism 25 is drive controlled by the tilt controller 28 to adjust the tilt of the DVD optical disk pickup 12 in accordance with the amount of tilt detected by the tilt sensor 36. In this way, the laser light from the DVD optical pickup 12 is set so as to be perpendicularly incident on the recording surface of the optical disk 16 since the tilt of the DVD optical pickup 12 is altered and the amount of tilt of the optical disk 16 is corrected.

Furthermore, if the BD is contained in a cartridge, then the space between the optical disk and the tilt sensor 36 mounted on the DVD optical pickup 12 is blocked by the cartridge, for example, and detection of the amount of tilt by the tilt sensor 36 is impossible. In this case, the amount of tilt of the optical disk 16 is detected by the tilt sensor 37 mounted on the BD optical pickup 31 while the optical disk 16 is recorded or reproduced by the Blu-ray optical pickup 31, and the height adjustment mechanism 35 is drive controlled by the tilt controller 28 to adjust the tilt of the BD optical disk pickup 31 in accordance with the amount of tilt detected by the tilt sensor 37. In this way, the laser light from the BD optical pickup 31 is set so as to be perpendicularly incident on the recording surface of the optical disk 16 since the tilt of the BD optical pickup 31 is altered and the amount of tilt of the optical disk 16 is corrected.

In such an optical disk drive device 10A of the present embodiment, even when recording or reproducing with either one of the DVD optical pickup 12 or the BD optical pickup 31, the tilt sensors 36 and 37 can be selectively used, and the amount of tilt can be corrected regardless of whether or not the optical disk 16 is contained in a cartridge.

It should be noted that in the case in which the optical disk 16 is not contained in a cartridge, and in which the optical disk 16 is recorded or reproduced by the DVD optical pickup 12 in parallel with detection by the tilt sensor 37, or is recorded or reproduced by the BD optical pickup 31 in parallel with detection by the tilt sensor 36, by detecting the amount of tilt of the optical disk 16 at an appropriate position that is further ahead of the recording or reproduction position of the optical disk 16, it is also possible to cancel the time lag from the detection of the amount of tilt to the adjustment of the tilt of the laser light axis from the optical pickup.

Furthermore, when initially setting the laser power, for example, of the optical pickup that is performed before starting to record or reproduce the optical disk 16, by moving the other optical pickup and detecting the amount of tilt by the tilt sensor mounted on the other optical pickup, and by storing the characteristics of the amount of tilt in a position in the radial direction of the optical disk in a memory and using the characteristics of the amount of tilt in the memory, it is also possible to adjust the tilt of the laser light axis from the optical pickup that performs recording or reproduction in accordance with a radial position, and to correct the amount of tilt.

It should be noted that the present application is based on application number 2002-321300 applied for in Japan, and the content therein is incorporated in the present application by reference. Furthermore, all references cited by the present specification are specifically incorporated in the present application by reference.

INDUSTRIAL APPLICABILITY

With the present invention as described above, with the precondition that at least two optical pickups are provided to record or reproduce optical disks such as CD or DVD, the tilt of the optical disk is detected by tilt detecting means with one of the optical pickups, and recording or reproduction of the optical disk, and correction of the tilt of the laser light axis from the optical pickup is performed with the other optical pickup. Thus, for example, it is possible to position the optical pickups, for example, in the same position in the radial direction of the optical disk, detect the tilt of the optical disk at this position, record or reproduce the optical disk and adjust the tilt of the laser light axis from the optical pickup. Furthermore, since focusing of the optical pickups is carried out separately, it is possible to favorably perform both detection of the tilt of the optical disk, and recording or reproduction of the optical disk.

Furthermore, it is possible to cancel out the time lag from detecting the tilt of the optical disk at the recording or reproduction position to adjusting the tilt by moving the detection position of the tilt of the optical disk to a position that is always an appropriate distance ahead of the recording or reproduction position of the optical disk.

Moreover, since the tilt detecting means detects the tilt of the optical disk while performing the initial settings relating to recording or reproduction of the optical disk, it is possible to detect the characteristics of the tilt of the optical disk for positions in the radial direction of the optical disk before commencing recording or reproduction of the optical disk.

It should be noted that the present invention is particularly useful when handling optical pickups provided with an objective lens that has a large numerical aperture (NA), in which recording and reproduction characteristics easily deteriorate with disk tilt and in which the optical disk has a high recording density.

The invention claimed is:

1. An optical disk drive device, comprising:
   at least two optical pickups that are arranged so as to reproduce the same surface of an optical disk;
   a guiding means for each optical pickup for moving the optical pickups in the radial direction of the optical disk;
   a tilt detecting means provided on at least one of the optical pickups for detecting the tilt of the optical disk; and
   a tilt correcting means, provided on at least the other of the optical pickups for adjusting the tilt of a laser light axis from the optical pickup with respect to the optical disk, in accordance with a detection result of the tilt detecting means;
   wherein detection of the tilt of the optical disk is performed by the tilt detecting means on the one of the optical pickups, and recording or reproduction of the optical disk, and adjustment of the tilt of the laser light axis by the tilt correcting means is performed on the other of the optical pickups.

2. The optical disk drive device according to claim 1, wherein the position of the guide means of the other optical pickup is adjusted and fixed with respect to a disk receiving surface of a turntable, such that the tilt of the laser light axis from the other optical pickup on which the tilt detecting means is provided is 0 (zero) with respect to the disk receiving surface of the turntable onto which the optical disk is loaded.

3. The optical disk drive device according to claim 1, wherein the optical pickups are moved in the radial direction of the optical disk by the respective guiding means,
   wherein the one optical pickup that is provided with the tilt detecting means is moved ahead of the other optical pickup that is provided with the tilt correcting means; and
   wherein in the same position in the radial direction of the optical disk, detection of the tilt of the optical disk by the tilt detecting means of the one optical pickup is performed ahead of adjustment of the tilt of the laser light axis from the other optical pickup by the tilt correcting means.

4. The optical disk drive device according to claim 3, further comprising:
   a memory for storing tilt information about the tilt of the optical disk that is detected by the tilt detecting means, and radial position information about the radial position of the optical disk in which at least the one optical pickup is moved in the radial direction of the optical disk by the guiding means;
   wherein at least during recording or reproduction of the optical disk, the tilt information and the radial position information of the optical disk are stored and held in the memory.

5. The optical disk drive device according to claim 1, wherein the one optical pickup that is provided with the tilt detecting means is moved in the radial direction of the optical disk by the guiding means to detect the tilt of the optical disk by the tilt detecting means while initial settings relating to recording or reproduction of the optical disk are performed on the other optical pickup side that is provided with the tilt correcting means.

6. The optical disk drive device according to claim 5, further comprising:
   a memory for storing at least tilt information about the tilt of the optical disk that is detected by the tilt detecting means.

7. The optical disk drive device according to claim 1, further comprising:
   a memory for storing tilt information about the tilt of the optical disk that is detected by the tilt detecting means, and radial position information about the radial position of the optical disk in which at least the one optical pickup is moved in the radial direction of the optical disk by the guiding means;
   wherein at least during recording or reproduction of the optical disk, the tilt information and the radial position information of the optical disk are stored and held in the memory.

8. A method for correcting tilt of an optical pickup, the method comprising:
   a step of performing recording or reproduction of an optical disk by a first optical pickup while moving the first optical pickup in the radial direction of the optical disk, and of detecting the position of the first optical pickup in the radial direction of the optical disk;
   a step of moving a second optical pickup to the position, or the vicinity of the position, of the first optical pickup that was detected, and of detecting the tilt of the optical disk on the side of the second optical pickup; and
   a step of adjusting the tilt of a laser light axis from the first optical pickup, in accordance with the tilt of the optical disk that was detected.

* * * * *